United States Patent

Mauchlen

[11] Patent Number: 4,572,011
[45] Date of Patent: Feb. 25, 1986

[54] MECHANICAL THRUSTER

[75] Inventor: Donald B. Mauchlen, Sherkstron, Canada

[73] Assignee: Her Majesty the Queen in right of Canada, as represented by the Minister of National Defence, Ottawa, Canada

[21] Appl. No.: 542,710

[22] Filed: Oct. 17, 1983

[30] Foreign Application Priority Data

Dec. 8, 1982 [CA] Canada ................................. 417293

[51] Int. Cl.⁴ ............................................ F16H 5/74
[52] U.S. Cl. ..................................... 74/3.5; 244/149; 292/252; 220/260
[58] Field of Search .............................. 74/2, 3.5, 3.52; 244/149, 150; 114/367; 292/252; 294/83 AA; 220/260

[56] References Cited

U.S. PATENT DOCUMENTS

| | | | |
|---|---|---|---|
| 1,510,445 | 9/1924 | Henry | 74/2 |
| 2,265,589 | 12/1941 | Wild | 74/2 |
| 2,525,608 | 10/1950 | Kuntz | 74/3.5 |
| 2,580,596 | 1/1952 | Richardson | 74/2 |
| 2,780,428 | 2/1957 | Moran | 244/149 |
| 3,017,776 | 1/1962 | Roby, Sr. | 74/2 |
| 3,242,666 | 3/1966 | Peterson | 294/83 AA |
| 3,291,424 | 12/1966 | Hatfield et al. | 244/149 |
| 4,127,966 | 12/1978 | Schmidt | 292/252 X |
| 4,227,663 | 10/1980 | Ramsey et al. | 244/149 |

Primary Examiner—William L. Freeh
Assistant Examiner—Paul Neils
Attorney, Agent, or Firm—Stevens, Davis, Miller & Mosher

[57] ABSTRACT

A mechanical thruster for positively separating two releasably joined components under a controlled time delay. The thruster is particularly useful for mechanically opening canisters containing survival kits as they are being dropped from an airplane to a target. The thruster comprises an adjustable mechanical timing means which is actuated when a pin is pulled from it. After a predetermined time delay, the timing means actuates a plunger mechanically associated with it, which plunger dislodges a locking piston. This locking piston in locking position mechanically holds a thruster body about a barrel of the device. Once the locking piston is displaced, the thruster body is propelled away from the barrel. When the mechanical thruster is secure to the main body of a container, and the thruster body is attached to the container lid, separation of the thruster body from the rest of the thruster causes the container lid to separate from the container, making it possible for the container contents to be removed from the container. The device according to the present invention can be used in place of known, pyrotechnic thruster devices.

8 Claims, 5 Drawing Figures

MECHANICAL THRUSTER

BACKGROUND OF THE INVENTION

According to the present invention there is provided a mechanical thruster for positively separating two joined components from each other under a controlled time delay. More particularly there is provided a time controlled device for mechanically opening survival kit containers carried in aircraft as the containers are being dropped to a target area.

Military and civilian long range search and rescue operations often require the dropping of survival kits containing food, medical supplies, radio equipment and, at sea, life rafts, from an airplane to a target area in the vicinity of a person to be rescued. In the past, survival kits have been carried in the cockpits of the search and rescue planes and manually dropped, through an open window in the plane, to the target area. A more accurate method of dropping such survival kits to persons awaiting rescue has been to carry the kits in canisters or containers having a separable lid, such containers being carried on the wings or in the bomb bays of the airplane. Such containers are secured to the plane by securing means mechanically or electronically releasable by the pilot or a crew member of the airplane. At the time of release, a pyrotechnic thruster unit, secured to the container is actuated by extraction of an arming cable or pin therefrom. After a predetermined time a charge in the thruster explodes causing the parts of the thruster to separate with the container lid and enabling the container contents to be discharged. If the survival kit is attached to a parachute, the parachute then opens, and the survival kit commences a slow descent to the rescue site.

Such pyrotechnic thruster devices, because of their very nature, possess inherent problems and disadvantages. Because they contain explosive charges, they are inherently dangerous. They must be inspected and controlled over a period of time because of the gradual deterioration of the explosive materials used. Such devices do not permit variation at the time for actuation, thus prohibiting a pilot from adjusting the delivery trajectory of the survival kit to the rescue area according to plane altitude, wind and weather conditions and the like. As well, there is always the possibility of electromagnetic interference from the aircraft which might prematurely cause such a pyrotechnic thruster to become actuated and its charge to explode.

It is an object of the present invention, therefore, to provide a thruster unit for opening containers, for example, for survival kits, by purely mechanical means. It is a further object of the present invention to provide an adjustable time delay in the actuation of such a thruster unit.

SUMMARY OF THE INVENTION

According to the present invention, there is provided a mechanical thruster for positively separating two releasably joined components (for example the body and lid of a container for a survival kit) with respect to each other under a controlled time delay. The thruster comprises a frame, to be secured to one of the components, in which frame is secured an adjustable mechanical timing means, (for example a wheel and pallet-type timing device). The timing means may additionally include a barometric time delay, as will be described in more detail hereinafter. A mechanical actuation means such as an arming pin is releasably secured to the frame and associated with the timing means to actuate the timing means when the pin is released. A movable strike means is secured to the frame and mechanically associated with the timing means, movement of the strike means to be actuated by the timing means at a predetermined time interval after the mechanical actuation means has been released. A thruster body is secured to the other of the components with the thruster body being normally and releasably secured to the frame against a bias tending to move it away from the frame. A lock means is associated with the thruster body and movable with respect thereto from locking position, in which movement of the thruster body, when in position secured to the frame, away from the frame, is prevented by obstruction of the lock means, to releasing the position in which the lock means does not obstruct movement of the thuster body away from the frame and the thruster body is caused to be propelled away from it under the bias exerted on the thruster body. A lock releasing means associated with the lock means is provided to normally hold the lock means in locking position. The lock releasing means is positioned with respect to the strike means to receive the impact from it. Upon receiving the impact from the strike means, the lock releasing means is displaced to cause the lock means to be dislodged from locking position to releasing position and cause the thruster body to be propelled from the frame.

In a preferred embodiment, the movable strike means comprises a spring actuated plunger secured to the frame, the plunger being linearly movable within a barrel secured to the frame. The thruster body is cylindrical and is closed at one end and open at the other. The inner wall of the thruster body, between the ends thereof, is provided with a circumferential groove. A cylindrical barrel adapter is provided which is insertable in the open end of the thruster body so that the outer wall of the barrel adapter and the inner wall of the thruster body are flush. The inner wall of the barrel adapter are threaded to engage threads on the outer wall of the barrel. The walls of the barrel adapter are provided with holes therein alignable with the groove of the thruster body when the barrel adapter is in position within the thruster body. The lock means comprise ball bearings which are releasably seatable in the groove of the thruster body and the holes of the barrel adapter such that, when the groove and holes are aligned, the ball bearings are seatable therein to prevent relative axial movement of the thruster body with respect to the barrel adapter. The lock releasing means, in this embodiment, comprises a cylindrical locking piston which is axially slidable within the thruster body and barrel adapter between first, locking position and second, releasing position. The locking piston has its cylindrical outer surface contoured with one portion, proximal to the closed end of the thruster body when in position, being of a diameter which flushly fits within the barrel adapter to hold the ball bearings securely within the groove and holes, and an adjacent portion, proximal to the open end of the thruster body, of lesser diameter such that, when the piston is in second, releasing position, that portion is opposite the groove and holes and the ball bearings are free to become unseated. The locking piston is normally biased in first, locking position against movement to second, releasing position. The plunger faces the end of the locking position remote from the end cap so that the plunger can act on that end of the locking piston when the plunger is released, to overcome the bias on the locking piston and drive it to second, releasing position. The thruster body is then propelled away from the frame.

It will be understood that the main body of the thruster, being clamped to a survival kit container body, with the thruster body being clamped to the container lid will cause, when fired, the container lid to be separated from the container body, thus enabling the survival kit within the container to be removed therefrom.

Since the device according to the present invention does not require explosives, it is safer and avoids many of the problems of prior known, pyrotechnic thruster devices. As well, the timing of the firing of the device may be adjusted to greatly increase the accuracy of delivery of survival kits to a rescue area when containers carrying such thruster devices are dropped from an airplane. The device according to the present invention provides significant degree of reliability as well.

BRIEF DESCRIPTION OF THE DRAWINGS

These and other advantages of the invention will become apparent upon reading the following detailed description and upon referring to the drawings in which.

Figures 1, 2:
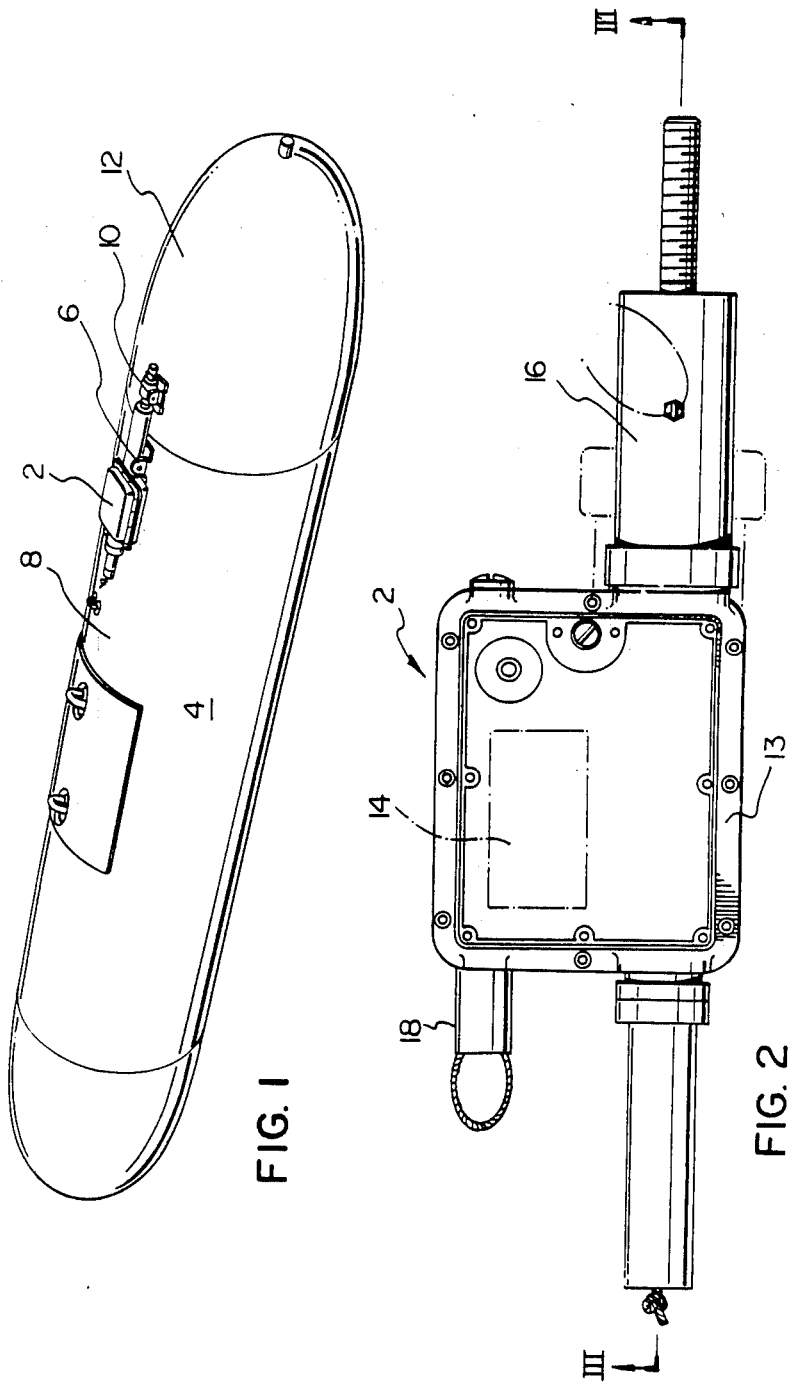
FIG. 1 is a perspective view of a survival kit container for use in aerial search and rescue operations, the container having attached to it a mechanical thruster assembly according to the present invention.
FIG. 2 is a plan view of the mechanical thruster assembly of FIG. 1.

While the invention will be described in connection with example embodiment, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features have been given similar reference numerals.

Turning to FIG. 1 there is shown a mechanical thruster assembly 2 according to the present invention, the assembly being secured to a survival kit container 4 by means of bracket 6 secured to container body 8 and bracket 10 secured to container lid or cap 12. In use for search and rescue in marine areas, container 4 would usually be provided with a survival kit comprising one or more life rafts, rope, first aid kit, food and the like. Such kits would be secured to a parachute device such that, when the kit was discharged from within the container body 8, subsequent to release from an aircraft, the survival kit would continue its descent at the slower rate of descent permitted by the parachute.

As can be seen in FIG. 2, thruster assembly 2 is made up of frame 13 within which is secured mechanical adjustable timing means 14. As well, to frame 13 is secured, for timed release, thruster body 16. Timing means 14 in the embodiment illustrated is a wheel and pallet-type timing device (construction details not shown) and, for example, is preferably a MK 10B (trade mark) unit used in the military for automatic actuation of parachute opening devices. The MK 10B timing device permits a one to seven second adjustment of its clock mechanism and, as well, is adjustable to permit barometric actuation of that clock mechanism at a certain pressure, once the mechanism has been actuated. Actuation of the timing device is achieved by release of arming pin 18, which arming pin, it will be understood, could be attached to the body of an aircraft such that, when container 4 is released from an aircraft, arming pin 18 is virtually simultaneously released so that the timing means is then actuated.

Figures 3, 4:
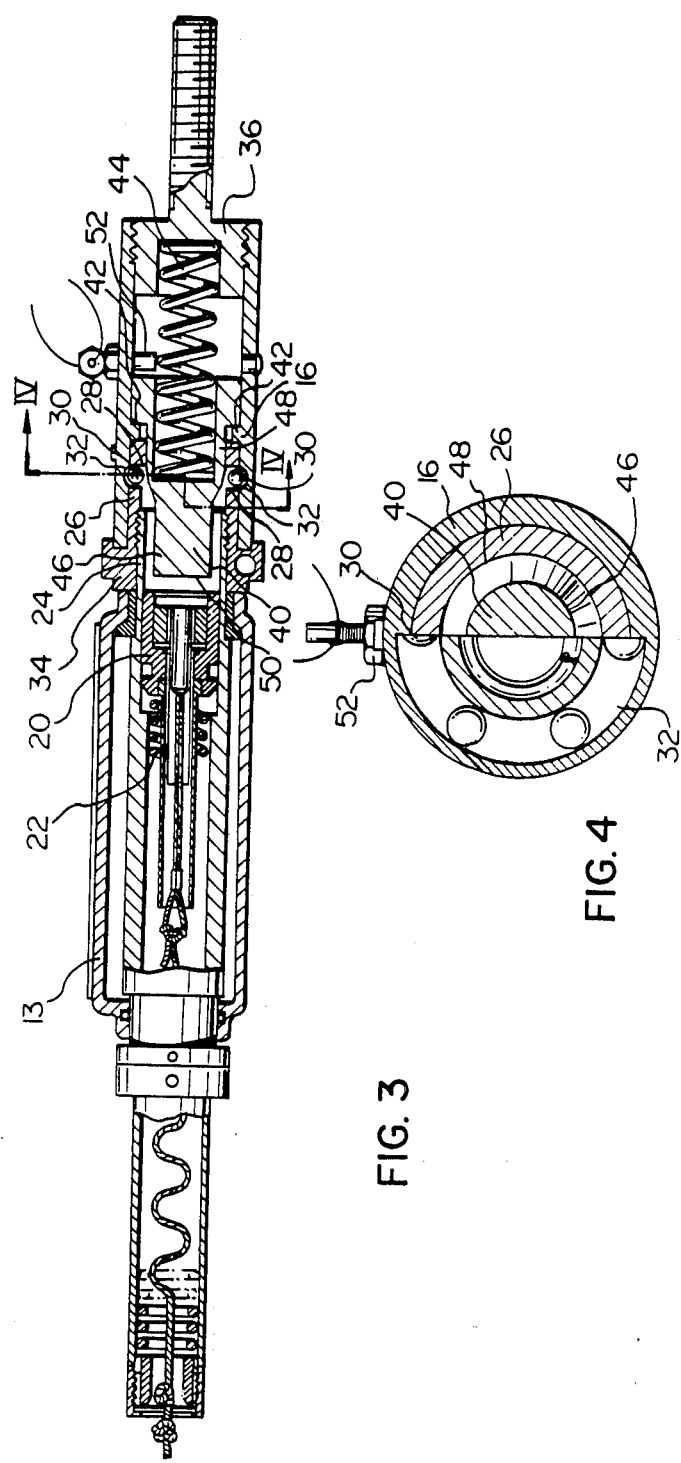
FIG. 3 is a section view of the thruster assembly along the line III—III of FIG. 2 with the thruster body in locked position secured to the thruster frame.
FIG. 4 is an enlarged section view of the thruster assembly along line IV—IV of FIG. 3.

As shown in FIG. 3, associated with timing mechanism 14 is a plunger 20 biased by spring 22 to be released linearly, to the right, within barrel 24. Timing mechanism 14 controls the time of release of plunger 20 in a manner which will be well understood by those skilled in the art, and thus details of this control arrangement are not shown.

Barrel 24, as can be seen in FIG. 3, is secured to the frame 13. To barrel 24 is threadably engaged, in the manner illustrated, cylindrical barrel adapter 26. Holes 28 are provided in the walls of barrel adapter 26 to receive ball bearings 30. Seated about barrel adapter 26 is cylindrical thruster body 16, thruster body 16 having an annular groove 32 which, when thruster body 16 is in proper alignment with barrel adapter 26, aligns with holes 28 to cooperate in receiving ball bearings 30. Six bearings are equally spaced about the barrel adapter 26 and thruster body 16 to share the load exerted on them. Securing ring 34, circumscribing barrel 24 is illustrated, preferably integrally associated with barrel adapter 26, receives in seated engagement the corresponding end of thruster body 16.

End cap 36 threadably engages the other end of thruster body 16.

Seated within thruster body 16 for linear movement between first, locking position (FIG. 3) and second, releasing position (phantom, FIG. 5) is locking piston 40. In the position illustrated in FIG. 3, locking piston 40 is biased against annular step 42 by spring 44, one end of which spring bears against end cap 36 and the other end of which bears against the locking piston. The cylindrical surface of locking piston 40 is stepped so that portion 46 near plunger 20 is of lesser diameter than portion 48 further away from the plunger, a gradual taper 49a being provided beneath the ball bearings 30 from portion 48 towards portion 46, and a greater taper 49b being provided between taper 49a and portion 46. the diameters of portions 46 and 48 are such that, when the piston is in first, locking position as illustrated, portion 48 fits flushly within barrel adapter 26 to hold ball bearings 30 within groove 32 and barrel adapter holes 28, and when the piston is in second, releasing position, portion 46 is opposite groove 32 and holes 28 and ball bearings 30 are free to become unseated. The gradual taper (e.g. 49a) beneath bearings 30 is designed to assist the spring 22 to move locking piston 40 from rest under high load.

Figure 5:
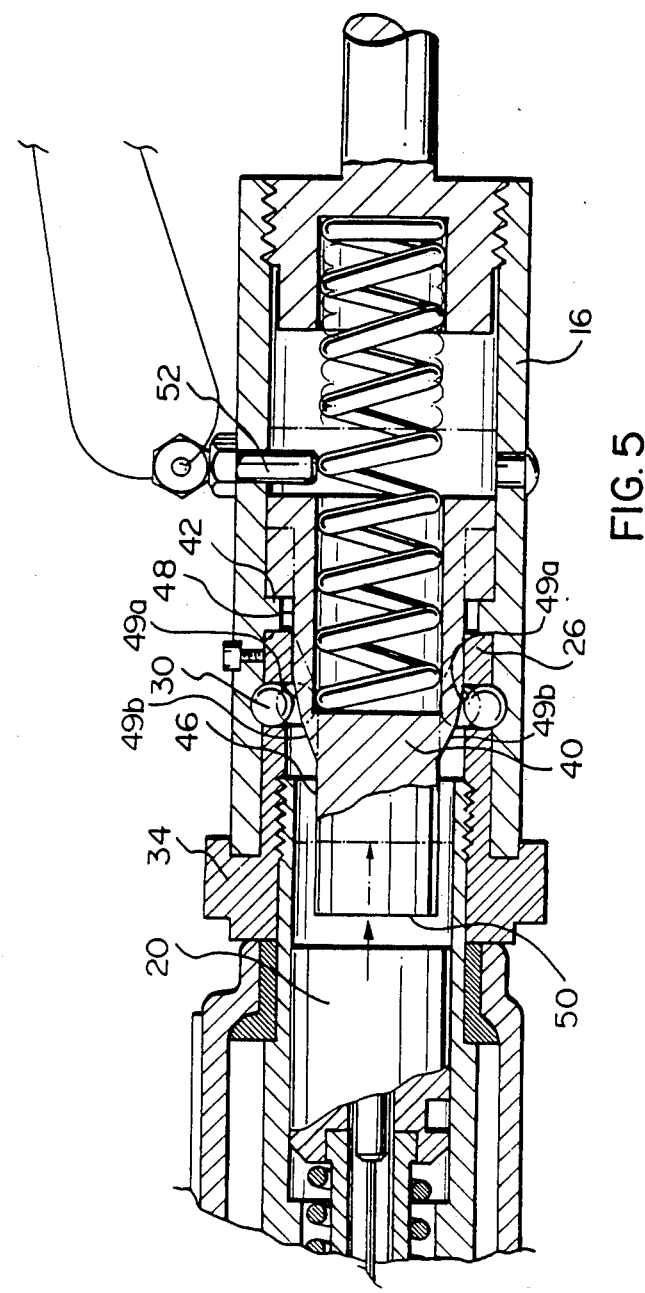
FIG. 5 is an enlarged partial section view of the thruster assembly according to FIG. 3 but showing in phantom the thruster body in releasing position.

In operation, when timing mechanism 14 causes plunger 20 to be released, it strikes against end surface 50 of locking piston 40 and, under urging of its spring 22, overcomes the bias of spring 44 against locking piston 40 to cause movement of that piston to the right to second, releasing position, as illustrated in phantom in FIG. 5, where the ball bearings become unseated and the thruster body 16 is driven to the right, off of barrel adapter 26 and propelled away from the rest of assembly 2. Since thruster body 16 is secured to bracket 10 which in turn is secured to container lid 12 (FIG. 1), container lid 12 is opened and the contents of container 4 are free to leave the container. Safety stop 52, illustrated in FIG. 3, is provided to resist against unpurposeful discharge of thruster body 2, by restricting movement of locking piston 42 away from first, locking position. Safety pin 52 would of course be removed before use of the thruster.

The device according to the present invention, as has been previously stated, permits a safer, more reliable mechanism for separating container lids from container bodies in such applications. It also provides the advantage of enabling a timed release of the contents of the container, enabling more accurate drops of such canisters during search and rescue operations.

Thus there has been provided in accordance with the invention a mechanical thruster device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

The embodiments of the invention in which an exclusive property or privilege is claimed are defined as follows:

1. In a canister having separably joined container and lid components, a mechanical thruster for positively separating the container and lid components with respect to each other under a controlled time delay, the thruster comprising:
    (a) a frame secured to one of the components;
    (b) a mechanical adjustable timing means secured within the frame;
    (c) a mechanical actuation means releasably secured to the frame and associated with the timing means to actuate the timing means when the actuation means is released;
    (d) movable spring-actuated strike means secured to the frame and mechanically associated with the timing means, movement of the strike means to be actuated by the timing means at a predetermined time interval after the actuation means has been released;
    (e) a thruster body secured to the other of the components, the thruster body being normally and releasably secured to the frame against a bias tending to move it away from the frame;
    (f) lock means associated with the thruster body and movable with respect thereto from locking position in which movement of the thruster body, when in position secured to the frame, away from the frame, is prevented by obstruction of the lock means, to releasing position in which the lock means does not obstruct movement of the thruster body away from the frame and the thruster body is caused to be propelled away from it under a bias exerted on the thruster body; and
    (g) lock releasing means associated with the lock means to normally hold the lock means in locking position, and positioned with respect to the strike means to receive the impact from it and which, upon receiving the impact from the strike means, is displaced to cause the lock means to dislodge from locking position to releasing position and cause the thruster body to be propelled from the frame.

2. A mechanical thruster according to claim 1 wherein the strike means and the lock release means are provided with surfaces which are facing when in position, the surfaces being normal to the direction of travel of the strike means and the lock release means.

3. A mechanical thruster according to claim 1 wherein the thruster body is closed at the one end by means of a cap having cylindrical external surfaces which threadably engage the interior surfaces of that end of the thruster body.

4. A mechanical thruster according to claim 1 further provided with a pair of clamps, one clamp secured to each of the components to be separated, one of the clamps secured to the thruster body, the other of the clamps secured to the frame.

5. A mechanical thruster according to claim 1 wherein the mechanical actuation means comprises an arming pin.

6. In a canister having separably joined container and lid components a mechanical thruster for positively separating the container and lid components with respect to each other under a controlled time delay, the thruster comprising:
    (a) a frame to be secured to one of the components;
    (b) a mechanical adjustable timing means secured within the frame;
    (c) a mechanical actuation means releasbly secured to the frame and associated with the timing means to actuate the timing means when the actuation means is released;
    (d) movable strike means comprising a spring-actuated plunger linearly movable within a barrel secured to the frame and mechanically associated with the timing means, movement of the plunger to be actuated by the timing means at a predetermined time interval after the actuation means has been released;
    (e) a cylindrical thruster body closed at one end and open at the other, the inner wall of the thruster body, between the ends thereof, being provided with a circumferential groove, the thruster body being secured to the other of the components, the thruster body being normally seated about the barrel and releasably secured to the frame against a bias tending to move it away from the frame;
    (f) a cylindrical barrel adapter insertable in the open end of the thruster body so that the outer wall of the barrel adapter and the inner wall of the cylindrical thruster body are flush, the inner wall of the barrel adapter being threaded to engage threads on the outer wall of the barrel, the walls of the barrel adapter being provided with holes therein alignable with the groove of the thruster body when the barrel adapter is in position within the thruster body;
    (g) lock means comprising ball bearings associated with the thruster body and movable with respect thereto from a locking position in which the groove and holes are aligned and the ball bearings are seated therein to prevent relative axial movement of the thruster body with respect to the barrel adapter, and a releasing position in which the ball bearings do not obstruct movement of the thruster body away from the frame and the thruster body is caused to be propelled away from it under a bias exerted on the thruster body; and (h) lock releasing means comprising a cylindrical locking piston axially slidable within the thruster body and barrel adapter between a first, locking position and a second, releasing position, the locking piston having its cylindrical outer surface contoured with one portion, proximal to the closed end of the thruster body of a diameter which flushly fits within the barrel adapter in the first locking position to hold the ball bearings securely within the groove and holes, and an adjacent portion, proximal to the open end of the thruster body, of lesser diameter such that, when the piston is in the second, releasing position, the adjacent portion is opposite the groove and holes and the ball bearings are free to become unseated, the locking piston being normally in the first, locking position and biased against movement to the second, releasing position, the end of the locking piston remote from the end cap facing the plunger to be acted on by the plunger when the plunger is released, to overcome the bias on the locking piston and drive it to the second, releasing position, whereby the thruster body is propelled from the frame.

7. A mechanical thruster according to claim 6 provided with a removable safety stop, the safety stop comprising a pin insertable through a hole in the wall of the thruster body so that a portion of that pin is seated immediately behind the end of the locking piston remote from the plunger.

8. A mechanical thruster according to claim 6 wherein a spring means acting on the closed end of the thruster body and on the end of the locking piston remote from the plunger biases the locking piston in first, locking position.

* * * * *